United States Patent
Wan et al.

(10) Patent No.: US 7,496,051 B2
(45) Date of Patent: Feb. 24, 2009

(54) NETWORK TOPOLOGY CONFIGURING METHOD AND NODE

(75) Inventors: Haoyi Wan, Yokohama (JP); Norihiro Ishikawa, Yokohama (JP); Hiromitsu Sumino, Yokosuka (JP); Takeshi Kato, Yokosuka (JP); Eiji Omata, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 643 days.

(21) Appl. No.: 11/031,007

(22) Filed: Jan. 10, 2005

(65) Prior Publication Data
US 2005/0237948 A1 Oct. 27, 2005

(30) Foreign Application Priority Data
Jan. 9, 2004 (JP) .............................. 2004-004663

(51) Int. Cl.
*G01R 31/08* (2006.01)
(52) U.S. Cl. ...................... 370/254; 709/220
(58) Field of Classification Search ........................ None
See application file for complete search history.

(56) References Cited

U.S. PATENT DOCUMENTS

| 4,996,524 | A | | 2/1991 | Tojima | |
|---|---|---|---|---|---|
| 5,946,679 | A | * | 8/1999 | Ahuja et al. ................... | 707/3 |
| 6,012,096 | A | | 1/2000 | Link et al. | |
| 6,643,286 | B1 | * | 11/2003 | Kapadia et al. ............. | 370/389 |
| 6,654,346 | B1 | * | 11/2003 | Mahalingaiah et al. ...... | 370/235 |
| 6,754,214 | B1 | * | 6/2004 | Mahalingaiah ............... | 370/392 |
| 7,054,951 | B1 | * | 5/2006 | Kao et al. .................... | 709/242 |
| 7,099,287 | B1 | * | 8/2006 | Oz et al. ...................... | 370/258 |
| 7,206,934 | B2 | * | 4/2007 | Pabla et al. .................. | 713/168 |
| 7,292,585 | B1 | * | 11/2007 | Slaughter et al. ............. | 370/400 |
| 2001/0015979 | A1 | * | 8/2001 | Hata et al. ................... | 370/403 |
| 2003/0131044 | A1 | | 7/2003 | Nagendra et al. | |
| 2004/0064512 | A1 | * | 4/2004 | Arora et al. ................. | 709/206 |
| 2004/0064568 | A1 | * | 4/2004 | Arora et al. ................. | 709/228 |
| 2004/0064693 | A1 | * | 4/2004 | Pabla et al. ................. | 713/168 |
| 2006/0173927 | A1 | * | 8/2006 | Beyer et al. ................. | 707/201 |

FOREIGN PATENT DOCUMENTS

| EP | 1 355 477 A2 | 10/2003 |
|---|---|---|
| EP | 1 519 520 A1 | 3/2005 |
| JP | 10-28128 | 1/1998 |
| JP | 10-065664 | 3/1998 |
| JP | 2001-24659 | 1/2001 |
| JP | 2001-136159 | 5/2001 |
| JP | 2003-289302 | 10/2003 |
| KR | 2001-0018574 | 3/2001 |
| WO | WO 03/079709 A1 | 9/2003 |
| WO | WO 2005/019996 A2 | 3/2005 |

* cited by examiner

*Primary Examiner*—Bob A Phunkulh
(74) *Attorney, Agent, or Firm*—Oblon, Spivak, McClelland, Maier & Neustadt, P.C.

(57) ABSTRACT

A node includes a manager configured to manage the hash value of the node and the hash values of adjacent nodes, and a calculator configured to calculate an insertion position of a new entry node in a ring network, based on the hash value of the new entry node, the hash value of the node and the hash values of the adjacent nodes.

10 Claims, 14 Drawing Sheets

| NODE POSITION | HASH VALUE | NODE ADDRESS |
|---|---|---|
| FRONT | $N_{i-1}$ | ADDRESS-$N_{i-1}$ |
| OWN | $N_i$ | ADDRESS-$N_i$ |
| BEHIND | $N_{i+1}$ | ADDRESS-$N_{i+1}$ |

<BEFORE UPDATE>

| NODE POSITION | HASH VALUE | NODE ADDRESS |
|---|---|---|
| FRONT | N | ADDRESS-N |
| OWN | N | ADDRESS-N |
| BEHIND | N | ADDRESS-N |

<AFTER UPDATE>

| NODE POSITION | HASH VALUE | NODE ADDRESS |
|---|---|---|
| FRONT | $N_i$ | ADDRESS-$N_i$ |
| OWN | N | ADDRESS-N |
| BEHIND | $N_{i+1}$ | ADDRESS-$N_{i+1}$ |

FIG.15

| NODE POSITION | HASH VALUE | NODE ADDRESS |
|---|---|---|
| 1(MINIMUM) | $N_i$ | ADDRESS-$N_i$ |
| 2 | $N_{i+1}$ | ADDRESS-$N_{i+1}$ |
| ⋮ | ⋮ | ⋮ |
| n(MAXIMUM) | $N_{i-1}$ | ADDRESS-$N_{i-1}$ |

NETWORK TOPOLOGY CONFIGURING METHOD AND NODE

CROSS REFERENCE TO RELATED APPLICATION

This application is based upon and claims the benefit of priority from the prior Japanese Patent Application No. P2004-4663, filed on Jan. 9, 2004; the entire contents of which are incorporated herein by reference.

BACKGROUND OF THE INVENTION

1. Field of the Invention

The present invention relates to a method of configuring a network topology when a new entry node joins a ring network which is constituted by a plurality of nodes. The present invention also relates to a node constituting a part of a ring network which is constituted by a plurality of nodes, and a node newly joining the ring network.

2. Description of the Related Art

Referring to FIGS. 1 to 5, a conventional network topology configuring method (a method used in the "Gnutella") will be described. In particular, operations for a node 105 to newly join a network including nodes 101 to 104 will be described.

First, as shown in FIG. 1, the node 105 establishes a connection with, among the nodes 101 to 104 constituting the network, the node 101 whose IP address or universal resource locator (URL) it knows.

Second, as shown in FIG. 2, the node 105 transmits a Ping message including the IP address of the node 105 to the node 101.

Third, as shown in FIG. 3, the node 101 returns a Pong message including the IP address of the node 101 to the node 105, and also transfers the Ping message including the IP address of the node 105 to the nodes 102 to 104.

Fourth, as shown in FIG. 4, the nodes 102 to 104 return Pong messages including their respective IP addresses to the node 105.

Repetition of the above procedure allows the node 105 to obtain the IP addresses of the nodes within the range specified in the time to live (TTL) field in the Ping message.

Fifth, as shown in FIG. 5, the node 105 establishes connections with the nodes 101 to 104 constituting the network, referring to their IP addresses included in the received Pong messages.

As a result, the node 105 can newly join the network constituted by the nodes 101 to 104.

In the conventional network topology configuring method, the new entry node 105 is configured to use Ping and Pong messages to randomly join a network, as described above.

The conventional network topology configuring method, however, has a problem in that the new entry node 105 has difficulty in quickly finding the positional relationships between the nodes in the network it has entered, and takes time to obtain network topology configuration information on each node constituting a part of the network.

The conventional network topology configuring method causes many links between nodes constituting a network. When a node failure or disengagement of a node from the network occurs, a number of messages are exchanged between adjacent nodes for update of network topology configuration information including information about the links. This causes the problem in that the network load is increased, and the nodes need time to update network topology configuration information.

BRIEF SUMMARY OF THE INVENTION

The present invention has been made in view of the above problems, and has an object of providing a network topology configuring method in which a new entry node joins a network by a predetermined algorithm, whereby the new entry node can quickly find the positional relationships between nodes in the network, and an occurrence of a node failure, disengagement or the like in the network only locally affects the network, and a node used in the network topology configuring method.

A first aspect of the present invention is summarized as a node constituting a part of a ring network. The node includes: a manager configured to manage a hash value of the node generated from identification information on the node and a hash value of an adjacent node generated from identification information on the adjacent node; and a calculator configured to calculate an insertion position in the ring network of a new entry node newly joining the ring network, based on a hash value of the new entry node generated from identification information on the new entry node, the hash value of the node and the hash value of the adjacent node.

In the first aspect of the invention, the node may further include: an obtainer configured to obtain the hash value of the new entry node from the new entry node; and an informer configured to inform the insertion position of the new entry node in the ring network to the new entry node.

In the first aspect of the invention, the calculator may be configured to compare the hash value of the new entry node with the hash value of the node and the hash value of the adjacent node, and to calculate the insertion position of the new entry node so that each node is arranged in the order of the hash values in the ring network.

In the first aspect of the invention, the manager may be configured to manage hash values of all nodes constituting the ring network, the hash values being generated from identification information on the nodes, and the calculator may be configured to calculate the insertion position of the new entry node in the ring network, based on the hash value of the new entry node and the hash values of all the nodes.

In the first aspect of the invention, the informer may be configured to limit nodes to which the insertion position of the new entry node is informed, to the new entry node and the adjacent node.

A second aspect of the present invention is summarized as a node newly joining a ring network constituted by a plurality of nodes. The node includes: a transmitter configured to transmit a hash value of the node generated from identification information on the node, to a predetermined node constituting a part of the ring network; and a connection establisher configured to establish connections with nodes involved, based on an insertion position of the node in the ring network informed from the predetermined node.

A third aspect of the invention is summarized as a method of configuring a network topology in a ring network constituted by a plurality of nodes. The method includes: calculating an insertion position in the ring network of a new entry node newly joining the ring network, based on a hash value of the new entry node generated from identification information on the new entry node, and hash values of at least one nodes constituting the ring network, generated from identification information on the nodes.

BRIEF DESCRIPTION OF THE SEVERAL VIEWS OF THE DRAWINGS

FIG. 15 is a diagram illustrating an example of a distributed hash table of a new entry node and a node in a ring network according to a second embodiment of the present invention;

DETAILED DESCRIPTION OF THE INVENTION

FIRST EMBODIMENT OF THE INVENTION

Figure 1:
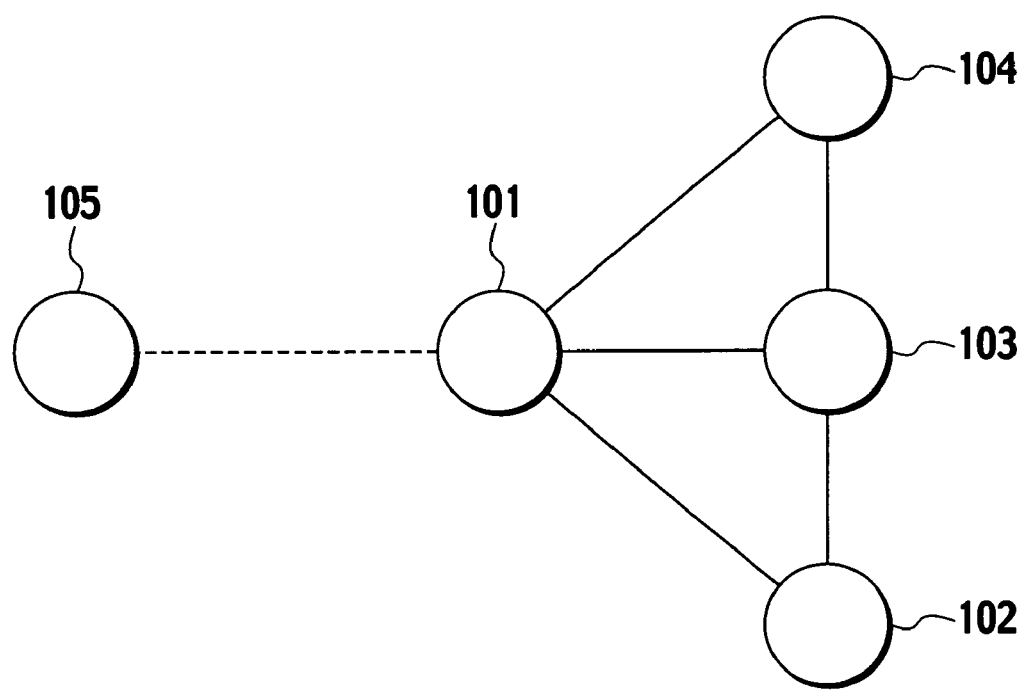
FIG. 1 is a diagram illustrating an operation in a prior art in which a new entry node establishes a connection with a node in a network.
Figure 2:
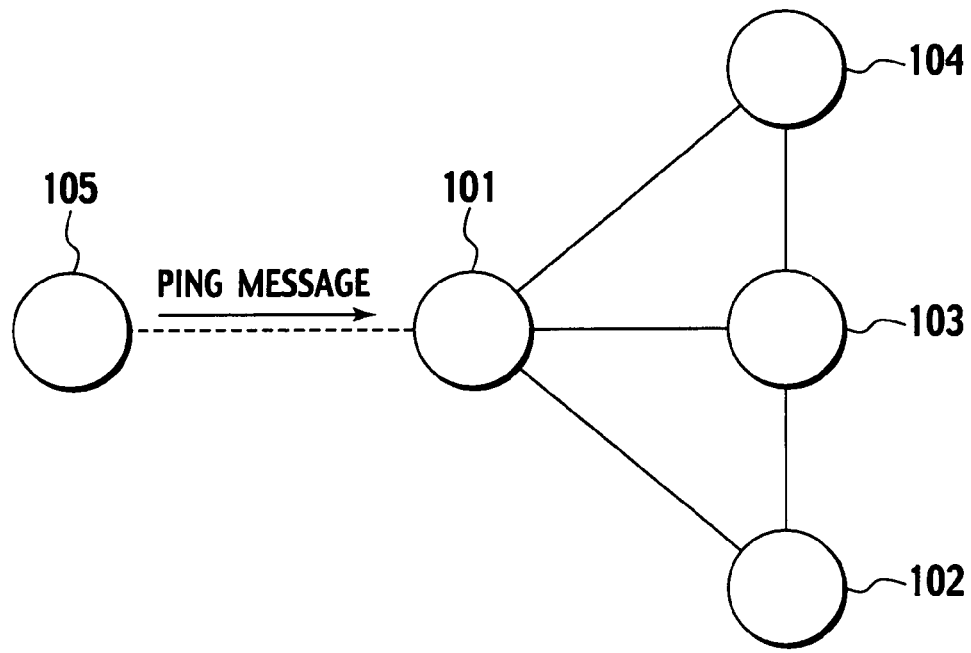
FIG. 2 is a diagram illustrating an operation in the prior art in which the new entry node transmits a Ping message to the node.
Figure 3:
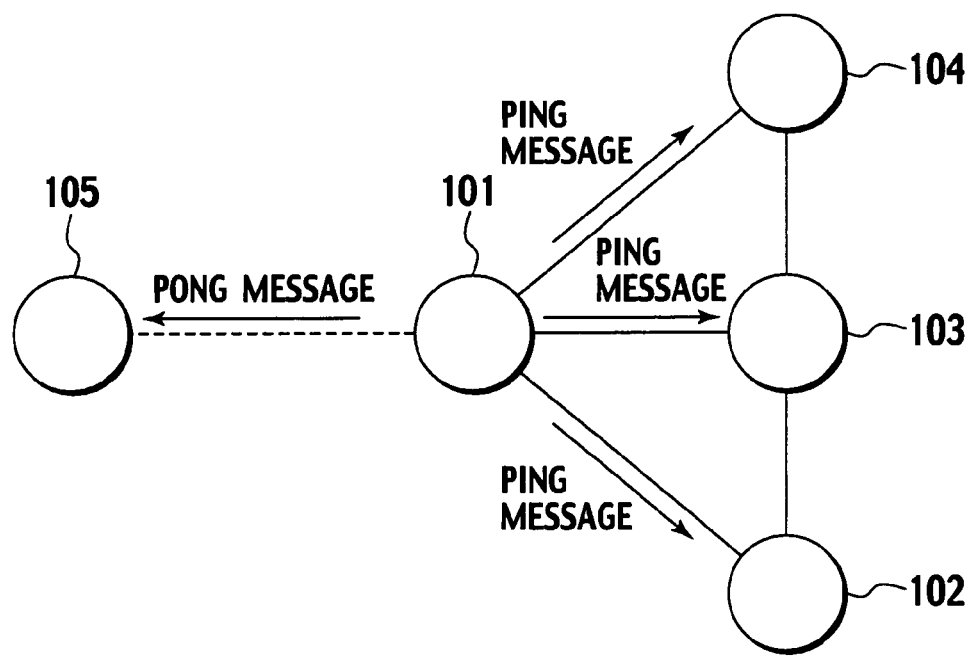
FIG. 3 is a diagram illustrating an operation in the prior art in which the node transmits a Pong message to the new entry node, and also transmits the Ping message to other nodes.
Figure 4:
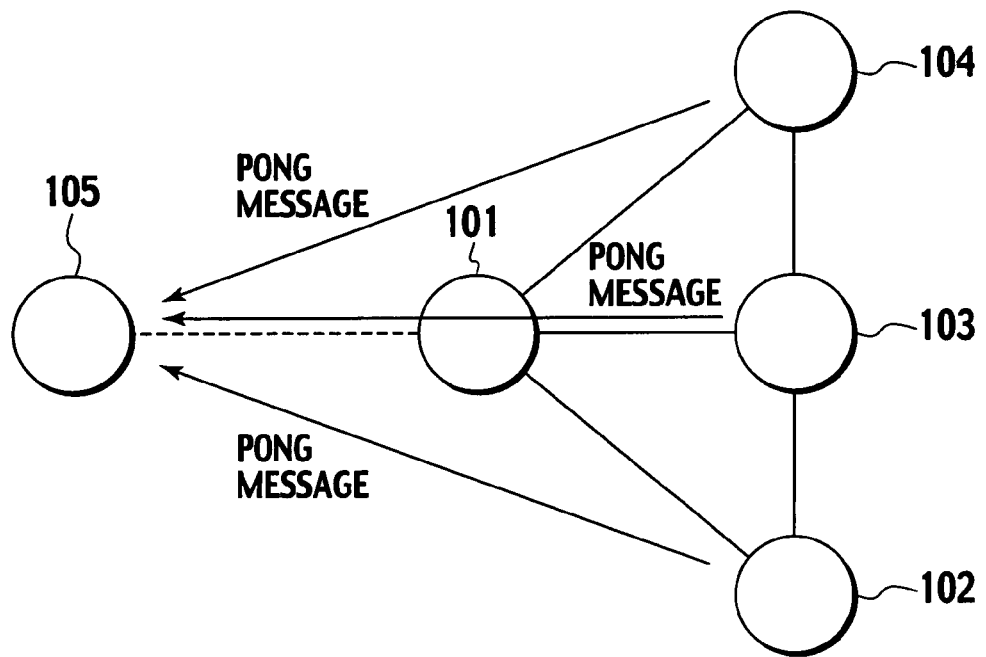
FIG. 4 is a diagram illustrating an operation in the prior art in which the other nodes transmit Pong messages to the new entry node.
Figure 5:
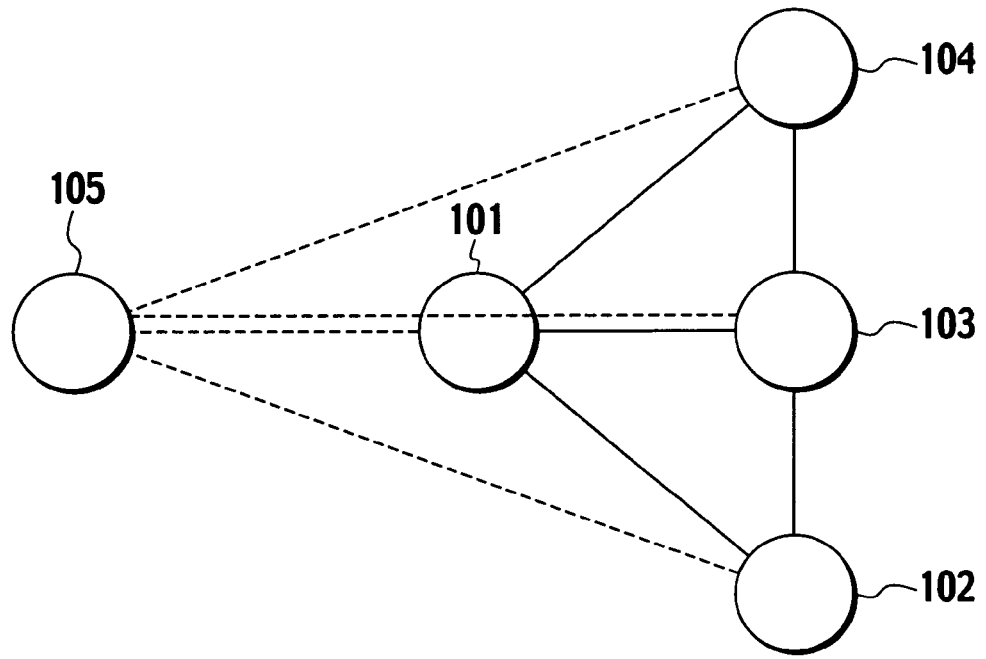
FIG. 5 is a diagram illustrating an operation in the prior art in which the new entry node establishes connections with the other nodes.
Figure 6:
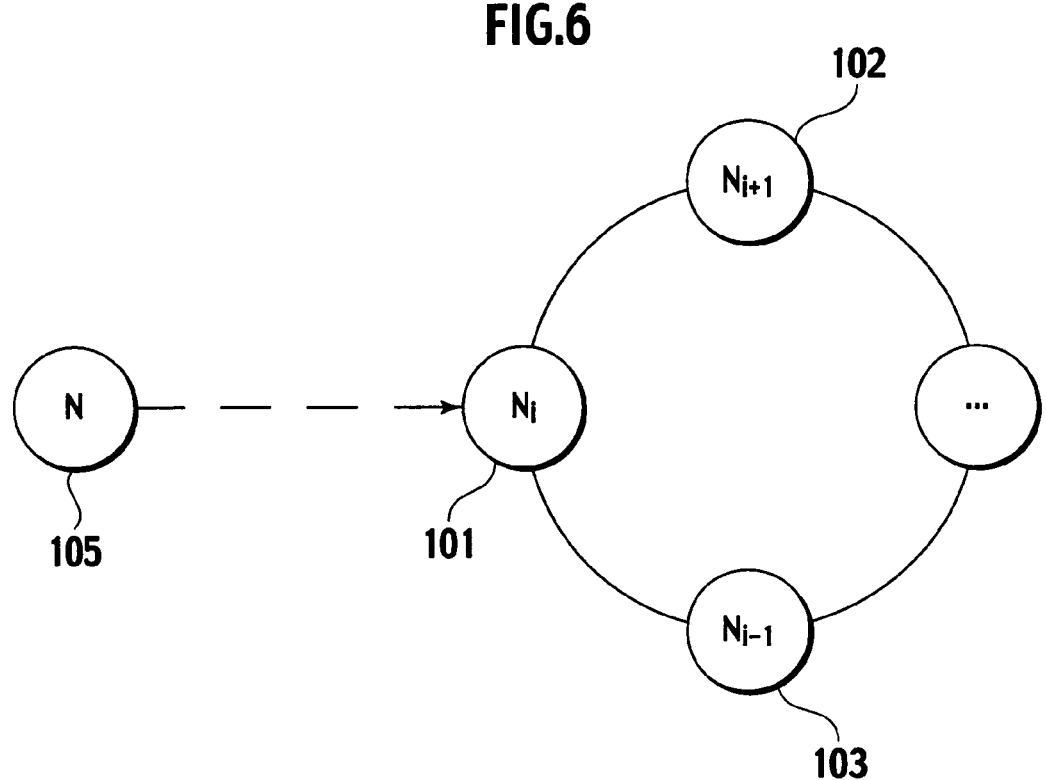
FIG. 6 is a diagram illustrating a state before a new entry node according to a first embodiment of the present invention newly joins a ring network.
Figure 7:
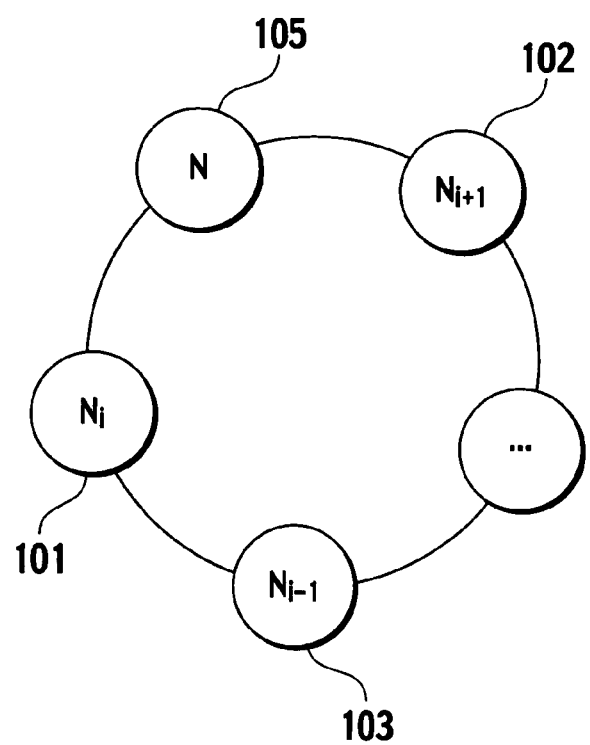
FIG. 7 is a diagram illustrating a state after the new entry node according to the first embodiment of the present invention joins the ring network.

With reference to FIGS. 6 to 15, a first embodiment of the present invention will be described below. This embodiment will be described with an example in which, as shown in FIG. 6, a new entry node 105 newly joins a ring network constituted by a plurality of nodes 101 to 103 and so on. In this embodiment, as shown in FIG. 7, the new entry node 105 is inserted between the node 101 and the node 102 in the ring network.

In this embodiment, as shown in FIGS. 6 and 7, the hash value of the node 101 is "$N_i$," the hash value of the node 102 is "$N_{i+1}$," the hash value of the node 103 is "$N_{i-1}$," and the hash value of the node 105 is "N". The hash values of the nodes 101, 102, 103 and 105 are generated from identification information on the nodes 101, 102, 103 and 105 (e.g., universal unique identifiers (UUIDs) or the like).

Figure 8:
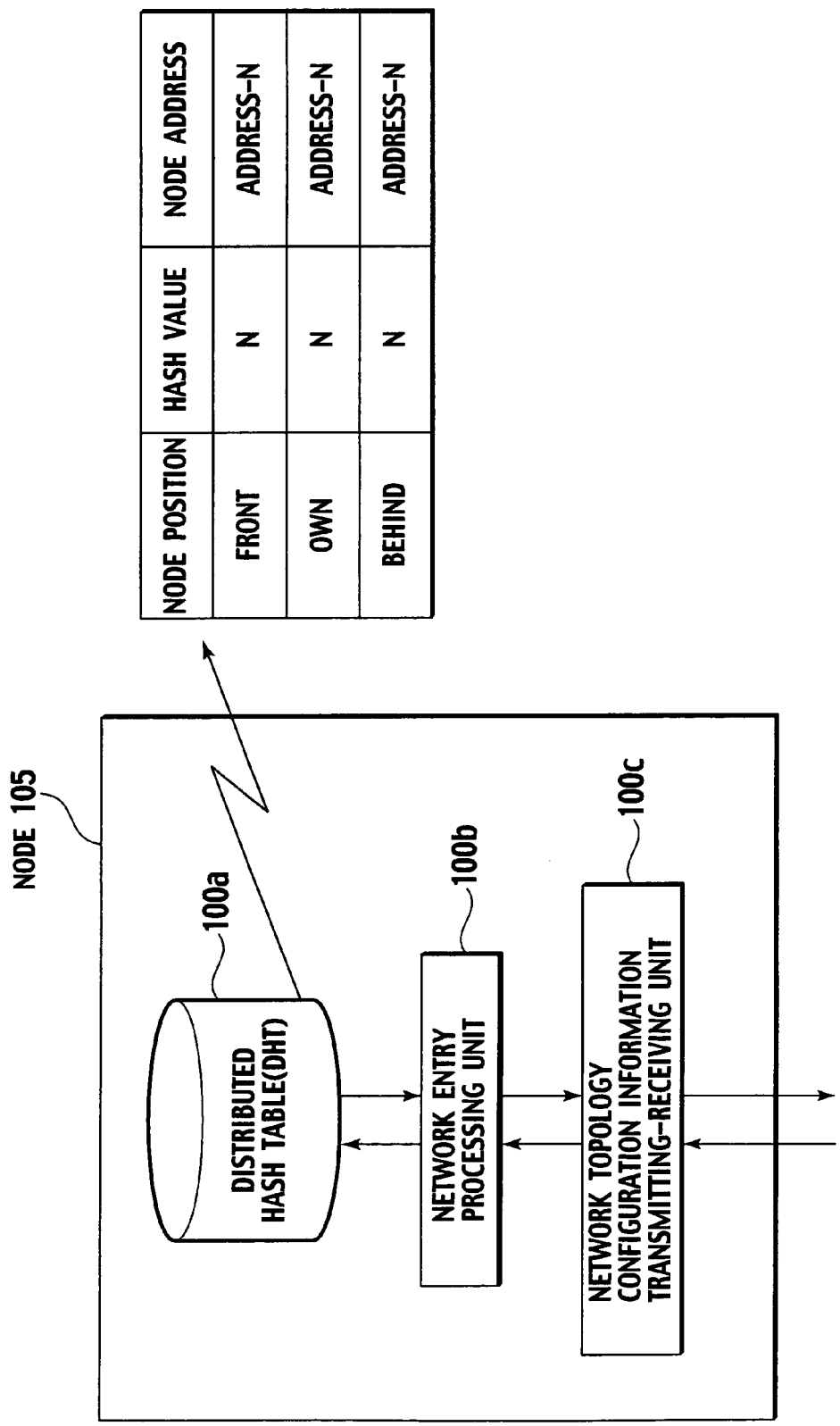
FIG. 8 is a functional block diagram of the new entry node according to the first embodiment of the present invention.

First, referring to FIG. 8, the functions of the new entry node 105 will be described. As shown in FIG. 8, the new entry node 105 includes a distributed hash table (DHT) 100a, a network entry processing unit 100b, and a network topology configuration information transmitting-receiving unit 100c.

The distributed hash table 100a is configured to manage the hash value "N" of the node 105 generated from the identification information on the node 105, and the hash values of adjacent nodes generated from identification information on the adjacent nodes.

More specifically, the distributed hash table 100a is configured to store records in each of which a node position, a hash value and a node address are associated as shown in FIG. 8.

A node position herein indicates the position of a node. Specifically, a node position="own" indicates the position of the node 105. A node position="front" indicates a position directly in front of the node 105. A node position="behind" indicates a position directly behind the node 105.

In a ring network here, each node is arranged in the order of their hash values. In many cases, a first node disposed in a position directly in front of a second node has a hash value smaller than the hash value of the second node, and a third node disposed in a position directly behind the second node has a hash value larger than the hash value of the second node (except for nodes having a minimum hash value and a maximum hash value)

Alternatively, in a ring network, each node may be arranged such that a first node disposed in a position directly in front of a second node has a hash value larger than the hash value of the second node, and a third node disposed in a position directly behind the second node has a hash value smaller than the hash value of the second node.

"Hash values" herein indicate the hash values of nodes disposed in their respective node positions. "Node addresses" herein indicate the node addresses of nodes disposed in their respective node positions (e.g., IP addresses or URLs).

In the example of FIG. 8, since the new entry node 105 has not yet joined the ring network, the hash values and the node addresses associated with the node positions are all those of the node 105 (the hash values=N and the node addresses=ADDRESS-N).

The network entry processing unit 100b is configured to perform processing required to newly join the ring network.

Specifically, in order to newly join the ring network, the network entry processing unit 100b is configured to extract the hash value and the node address of the node 105 from the distributed hash table 100a, and to generate network topology configuration information including the hash value and the node address of the node 105.

The network entry processing unit 100b is configured to instruct the network topology configuration information transmitting-receiving unit 100c to transmit the generated network topology configuration information to a node (e.g., the node 101) whose node address it knows.

Based on the insertion position of the node 105 in the ring network informed from the node (e.g., the node 101) to which the network topology configuration information has been transmitted, the network entry processing unit 100b is configured to establish connections with the nodes involved (e.g., the node 101 and the node 102), and to update the distributed hash table 100a based on the insertion position of the node 105.

The network topology configuration information transmitting-receiving unit 100c is configured to transmit the network topology configuration information to a node (e.g., the node 101), in accordance with an instruction from the network entry processing unit 100b.

The network topology configuration information transmitting-receiving unit 100c is configured to receive the network topology configuration information including the insertion position of the node 105 in the ring network informed from the node (e.g., the node 101).

The new entry node 105 is preferably configured to have a function of the node 101 to be described below (see FIG. 9).

Second, with reference to FIG. 9, the functions of the nodes constituting the ring network will be described. Since the functions of the nodes 101 to 103 are basically the same, hereinafter, the functions of the node 101 will be described.

Figure 9:
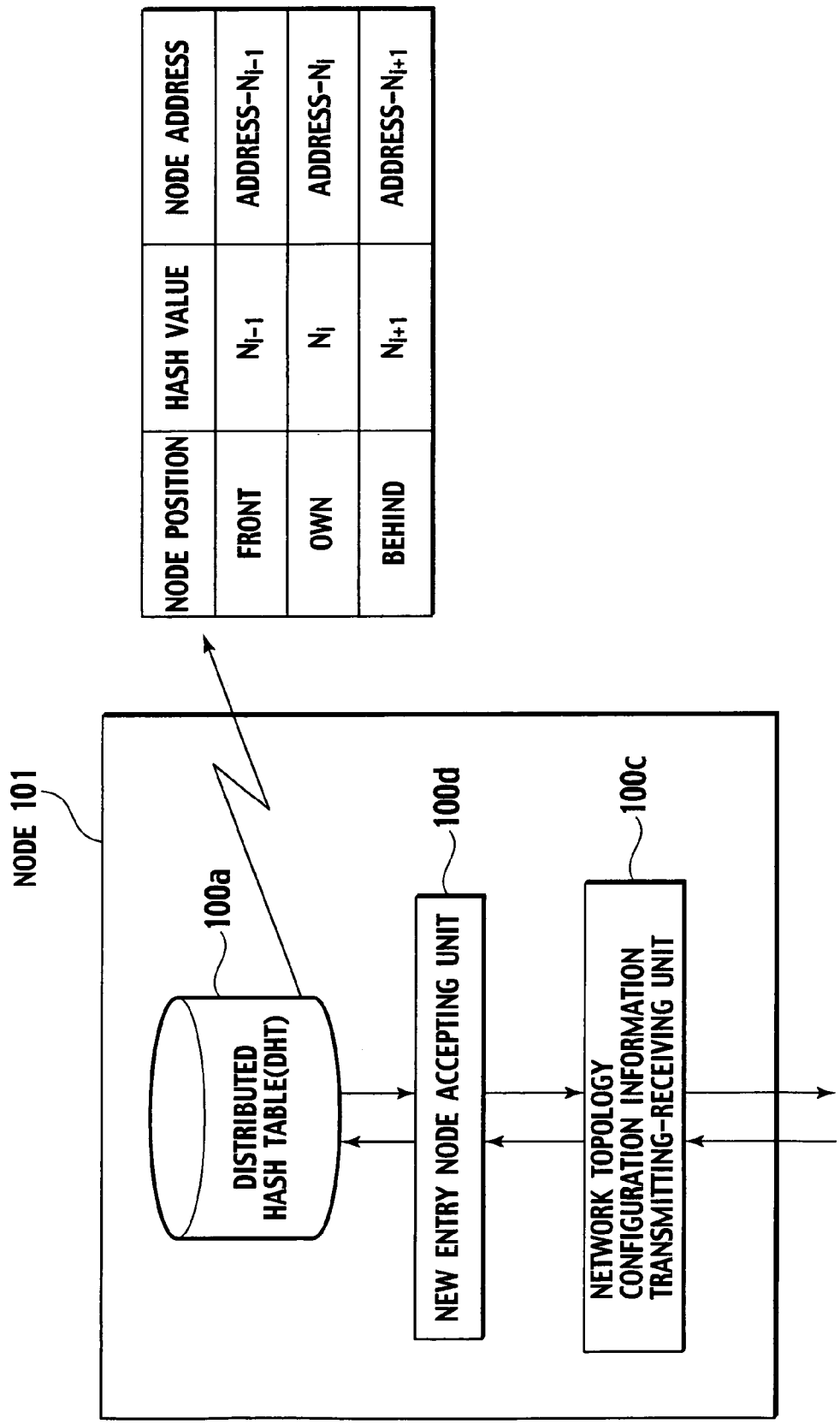
FIG. 9 is a functional block diagram of a node constituting a part of the ring network according to the first embodiment of the present invention.

As shown in FIG. 9, the node 101 includes a distributed hash table 100a, a new entry node accepting unit 100d, and a network topology configuration information transmitting-receiving unit 100c.

The distributed hash table 100a is configured to manage the hash value "$N_i$" of the node 101 generated from the identification information on the node 101, and the hash values of adjacent nodes generated from identification information on the adjacent nodes.

Specifically, the distributed hash table 100a is configured to store records in each of which a node position, a hash value and a node address are associated as shown in FIG. 9.

FIG. 9 exemplarily shows the distributed hash table 100a in a state prior to the entry of the new entry node 105. The distributed hash table 100a manages a record in which a node position="front", a hash value="$N_{i-1}$" (the hash value of the node 103), and the node address "ADDRESS-$N_{i-1}$" (the node address of the node 103) are associated with one another, a record in which a node position="own", a hash value="$N_i$" (the hash value of the node 101), and the node address "ADDRESS-$N_i$" (the node address of the node 101) are associated with one another, and a record in which a node position="behind", a hash value="$N_{i+1}$" (the hash value of the node 102), and the node address "ADDRESS-$N_{i+1}$" (the node address of the node 102) are associated with one another.

The new entry node accepting unit 100d is configured to perform processing required when the new entry node 105 newly joins the ring network.

Specifically, the new entry node accepting unit 100d is configured to calculate the insertion position of the new entry node 105 in the ring network, based on the hash value "N" of the new entry node 105 newly joining the ring network, the hash value "$N_i$" of the node 101 and the hash values "$N_{i+1}$" and "$N_{i-1}$" of the adjacent nodes 102 and 103.

At that time, the new entry node accepting unit 100d compares the hash value "N" of the new entry node 105 with the hash value "$N_i$" of the node 101 and the hash values "$N_{i+1}$" and "$N_{i-1}$" of the adjacent nodes 102 and 103, thereby calculating the insertion position of the new entry node 105 so that each node is arranged in the order of the hash values in the ring network.

In the example of FIG. 7, the magnitude of the hash values "$N_i$," "N," "$N_{i+1}$" and "$N_{i-1}$" of the nodes 101, 105, 102 and 103 increases in this order.

The new entry node accepting unit 100d can determine the arrangement of nodes having hash values of the same magnitude on a predetermined basis.

The new entry node accepting unit 100d is configured to obtain the hash value and the node address of a new entry node, via the network topology configuration information transmitting-receiving unit 100c.

The new entry node accepting unit 100d is configured to update the distributed hash table 100a, based on the insertion position of the new entry node 105 in the ring network; to generate network topology configuration information for informing the insertion position of the new entry node 105; and to instruct the network topology configuration information transmitting-receiving unit 100c to transmit the network topology configuration information to the new entry node 105 and the adjacent nodes 102 and 103.

The network topology configuration information may be configured to include the insertion position of the new entry node 105, or configured to include the distributed hash table 100a which reflects the insertion of the new entry node 105.

In accordance with the instruction from the new entry node accepting unit 100d, the network topology configuration information transmitting-receiving unit 100c is configured to transmit the network topology configuration information to the new entry node 105 and the adjacent nodes 102 and 103.

The network topology configuration information transmitting-receiving unit 100c is configured to receive the network topology configuration information including the hash value and the node address of the new entry node 105 informed from the new entry node 105.

Referring to FIGS. 10 to 14, operations in a network topology configuring method according to this embodiment will be described. In particular, operations for the new entry node 105 to newly join the ring network including the nodes 101 to 103 as shown in FIGS. 6 and 7 will be described.

First, with reference to FIGS. 10 and 11, the operation of the new entry node 105 on that occasion will be described.

Figure 10:
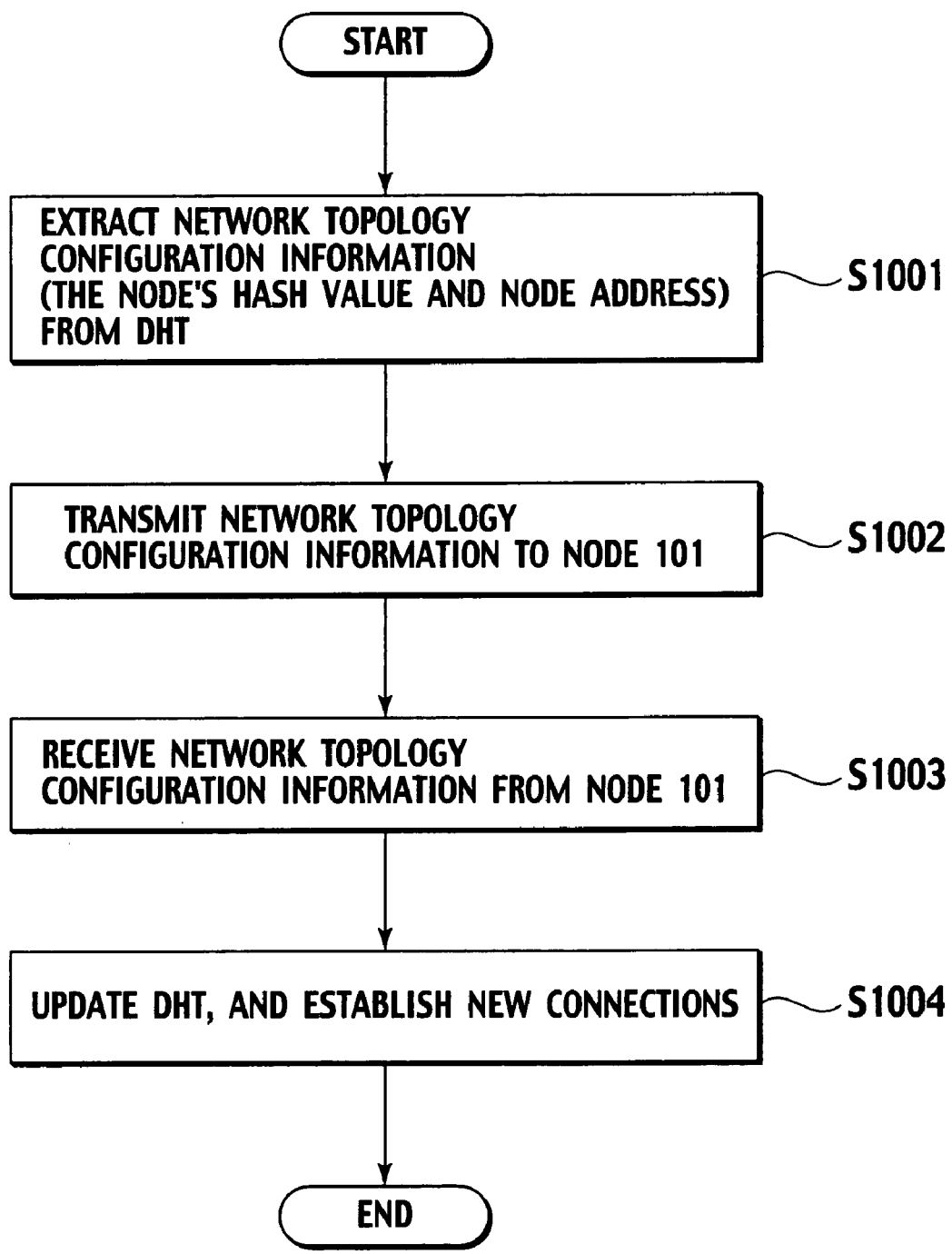
FIG. 10 is a flowchart illustrating an operation of the new entry node when the new entry node newly joins the ring network in the first embodiment of the present invention.

As shown in FIG. 10, in step 1001, the network entry processing unit 100b of the new entry node 105 extracts the hash value "N" and the node address "ADDRESS-N" of the node 105 from the distributed hash table 100a, and generates network topology configuration information including the extracted hash value "N" and the node address "ADDRESS-N."

In step 1002, according to an instruction from the network entry processing unit 100b, the network topology configuration information transmitting-receiving unit 100c of the new entry node 105 transmits the above-described network topology configuration information to the node 101.

In step 1003, the network topology configuration information transmitting-receiving unit 100c of the new entry node 105 receives, from the node 101, network topology configuration information including the insertion position of the new entry node 105 in the ring network (the position between the node 101 and the node 102 in this embodiment).

Figure 11:
FIG. 11 is a diagram for explaining update of a distributed hash table of the new entry node when the new entry node newly joins the ring network in the first embodiment of the present invention.

In step 1004, according to the received network topology configuration information, the network entry processing unit 100b of the new entry node 105 updates the distributed hash table 100a as shown in FIG. 11, and establishes new connections with the nodes involved (the nodes 101 and 102).

Second, with reference to FIGS. 12 to 14, the operation of the node 101 on that occasion will be described.

Figure 12:
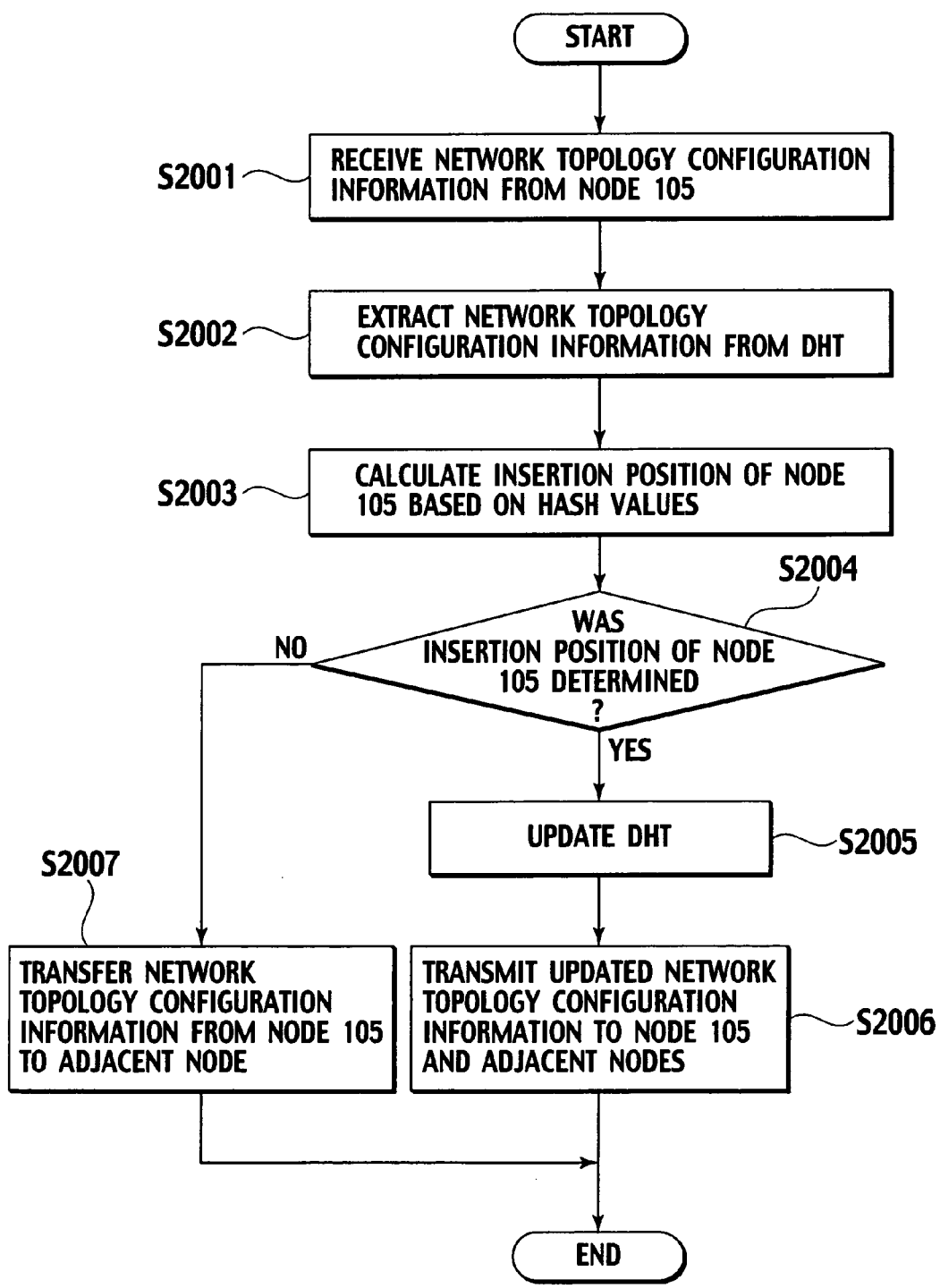
FIG. 12 is a flowchart illustrating an operation of the node when the new entry node newly joins the ring network in the first embodiment of the present invention.

As shown in FIG. 12, in step 2001, the new entry node accepting unit 100d of the node 101 receives the network topology configuration information including the hash value and the node address of the new entry node 105, from the new entry node 105, via the network topology configuration information transmitting-receiving unit 100c.

In step 2002, the new entry node accepting unit 100d extracts the hash value of the node 101 and the hash values of the adjacent nodes 102 and 103 from the distributed hash table 100a.

In step 2003, the new entry node accepting unit 100d calculates the insertion position of the new entry node 105 in the ring network, based on the received hash value of the new entry node 105 and the extracted hash values of the node 101 and the adjacent nodes 102 and 103.

Figure 13:
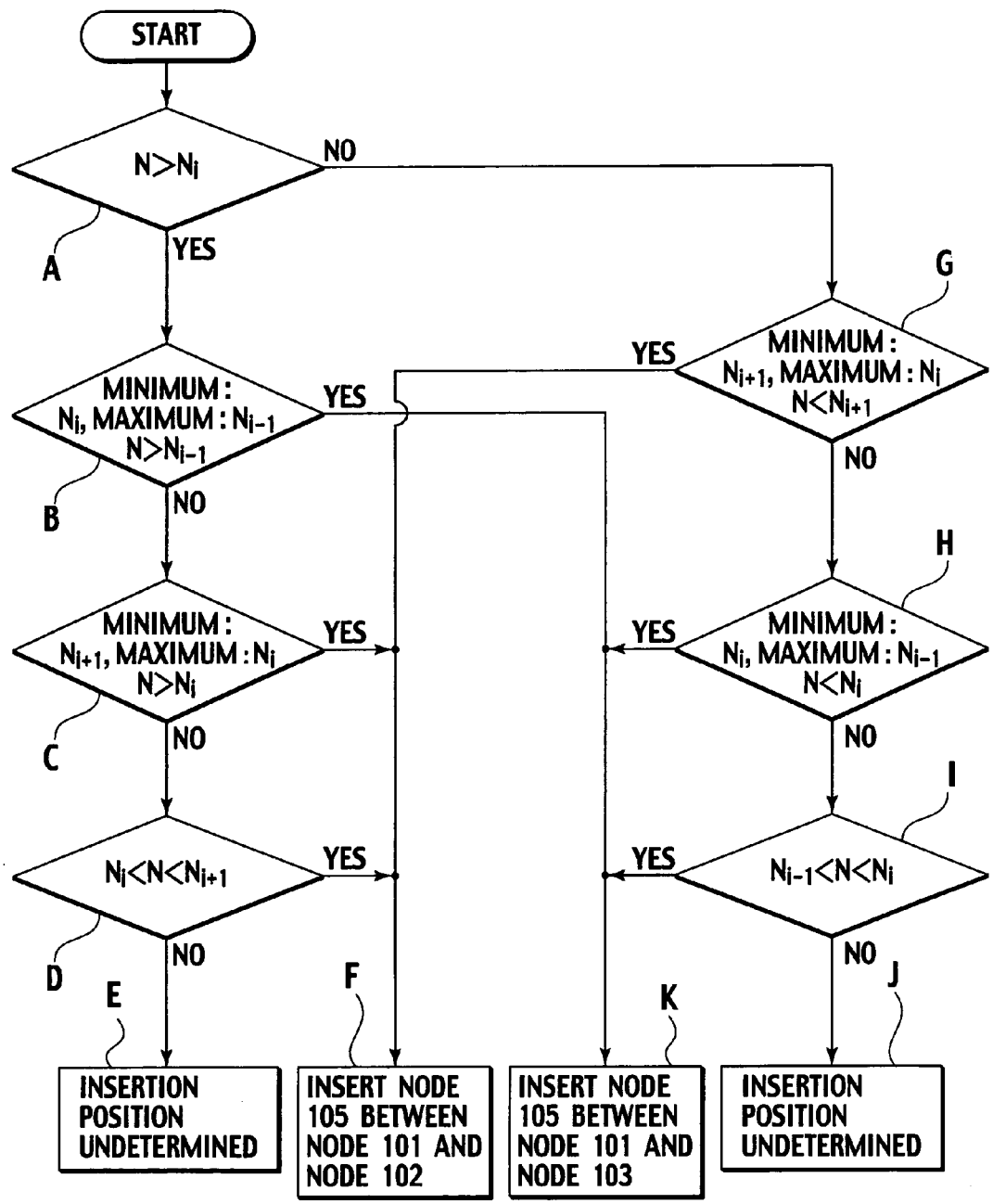
FIG. 13 is a flowchart illustrating an operation of the node calculating an insertion position of the new entry node when the new entry node newly joins the ring network in the first embodiment of the present invention.

With reference to FIG. 13, an exemplary algorithm by which the insertion position of the new entry node 105 is calculated in step 2003 will be described.

The new entry node accepting unit 100d is configured to determine whether the new entry node 105 should be inserted in a position between the node 101 and the node 102, or whether the new entry node 105 should be inserted in a position between the node 101 and the node 103, or otherwise to determine that the insertion position of the node 105 is undetermined.

In the example of FIG. 13, the hash values of the nodes increase clockwise in the ring network.

In step A, the algorithm compares the hash value "N" of the new entry node 105 with the hash value "$N_i$" of the node 101.

When the hash value "N" of the new entry node 105 is larger than the hash value "$N_i$" of the node 101, in step B, the algorithm determines whether three conditions: the minimum hash value=$N_i$; the maximum hash value=$N_{i-1}$; and N>$N_{i-1}$, are met or not.

When the three conditions are met in step B, in step K, the algorithm determines that the insertion position of the new entry node 105 is between the node 101 and the node 103.

When the three conditions are not met in step B, in step C, the algorithm determines whether three conditions: the minimum hash value=$N_{i+1}$; the maximum hash value=$N_i$; and N>$N_i$, are met or not.

When the three conditions are met in step C, in step F, the algorithm determines that the insertion position of the new entry node 105 is between the node 101 and the node 102.

When the three conditions are not met in step C, in step D, the algorithm determines whether the condition "$N_i$<N<$N_{i+1}$" is met or not.

When the condition is met in step D, in step F, the algorithm determines that the insertion position of the new entry node 105 is between the node 101 and the node 102.

When the condition is not met in step D, in step E, the algorithm determines that the insertion position of the new entry node 105 is undetermined. That is, the algorithm determines that the insertion position of the new entry node 105 is neither between the node 101 and the node 102 nor between the node 101 and the node 103.

When the hash value "N" of the new entry node 105 is not larger than the hash value "$N_i$" of the node 101, in step G, the algorithm determines whether three conditions: the minimum hash value=$N_{i+1}$; the maximum hash value=$N_i$; and N<$N_{i+1}$, are met or not.

When the conditions are met in step G, in step F, the algorithm determines that the insertion position of the new entry node 105 is between the node 101 and the node 102.

When the three conditions are not met in step G, in step H, the algorithm determines whether three conditions: the minimum hash value=$N_i$; the maximum hash value=$N_{i-1}$; and N<$N_i$, are met or not.

When the three conditions are met in step H, in step K, the algorithm determines that the insertion position of the new entry node 105 is between the node 101 and the node 103.

When the three conditions are not met in step H, in step I, the algorithm determines whether the condition $N_{i-1}$<N<$N_i$ is met or not.

When the condition is met in step I, in step K, the algorithm determines that the insertion position of the new entry node 105 is between the node 101 and the node 13.

When the condition is not met in step I, in step J, the algorithm determines that the insertion position of the new entry node 105 is undetermined. That is, the algorithm determines that the insertion position of the new entry node 105 is neither between the node 101 and the node 102 nor between the node 101 and the node 103.

The present invention is also applicable to a case where the hash values of nodes in a ring network increase counterclockwise.

Returning to the flowchart in FIG. 12, in step 2004, the new entry node accepting unit 100d determines whether the insertion position of the new entry node 105 is determined or not.

Figure 14:
FIG. 14 is a diagram for explaining update of a distributed hash table of the node when the new entry node newly joins the ring network in the first embodiment of the present invention.

When the insertion position of the new entry node 105 is determined, in step 2005, the new entry node accepting unit 100d updates the distributed hash table 100a as shown in FIG. 14, based on the determined insertion position of the new entry node 105.

In step 2006, the new entry node accepting unit 100d transmits network topology configuration information including the contents of the updated distributed hash table 100a, through the network topology configuration information transmitting-receiving unit 100c, to the new entry node 105 and the adjacent nodes 102, 103.

When the insertion position of the new entry node 105 is undetermined, in step 2007, the new entry node accepting unit 100d transfers the network topology configuration information from the new entry node 105 to an adjacent node (the node 102 or 103) through the network topology configuration information transmitting-receiving unit 100c.

The adjacent node receiving the network topology configuration information performs the operations in steps 2001 to 2007, like the node 101, to determine the insertion position of the new entry node 105 in the ring network.

According to the network topology configuring method in this embodiment, a network topology is configured such that each node is arranged in a ring network in the order of their hash values. Therefore, even the new entry node 105 can quickly find the positional relationships between the nodes in the network.

Also, according to the network topology configuring method in this embodiment, the nodes constituting a ring network only need to manage information on adjacent nodes. Therefore, the problem in that it takes time to obtain network topology configuration information on each node constituting a part of the network can be solved.

Also, according to the network topology configuring method in this embodiment, even when a node failure or a disengagement of a node from the network occurs, there is no need to exchange a number of messages between adjacent nodes for update of network topology configuration information including information about their links. The network load is thus reduced, and the problem in that each node takes time to update network topology configuration information can be solved.

SECOND EMBODIMENT OF THE INVENTION

In a second embodiment of the present invention, distributed hash tables 100a in a new entry node 105 and a node 101 are configured to manage the hash values of all the nodes constituting a ring network, generated from identification information on the nodes.

Specifically, as shown in FIG. 15, each distributed hash table 100a is configured to manage hash values and node addresses associated with node positions from "1" indicating the node position of a node having a minimum hash value to "n" indicating the node position of a node having a maximum hash value.

That is, the distributed hash table 100a is configured to manage network topology configuration information showing the topology of all the nodes constituting the ring network.

A new entry node accepting unit 100d of the node 101 according to this embodiment is configured to calculate the insertion position of the new entry node 105 in the ring network, based on the hash value "N" of the new entry node 105 and the hash values of all the nodes.

As a result, unlike the node 101 in the above-described first embodiment, the node 101 in this embodiment can always calculate the insertion position of the new entry node 105 in the ring network.

Figure 16:
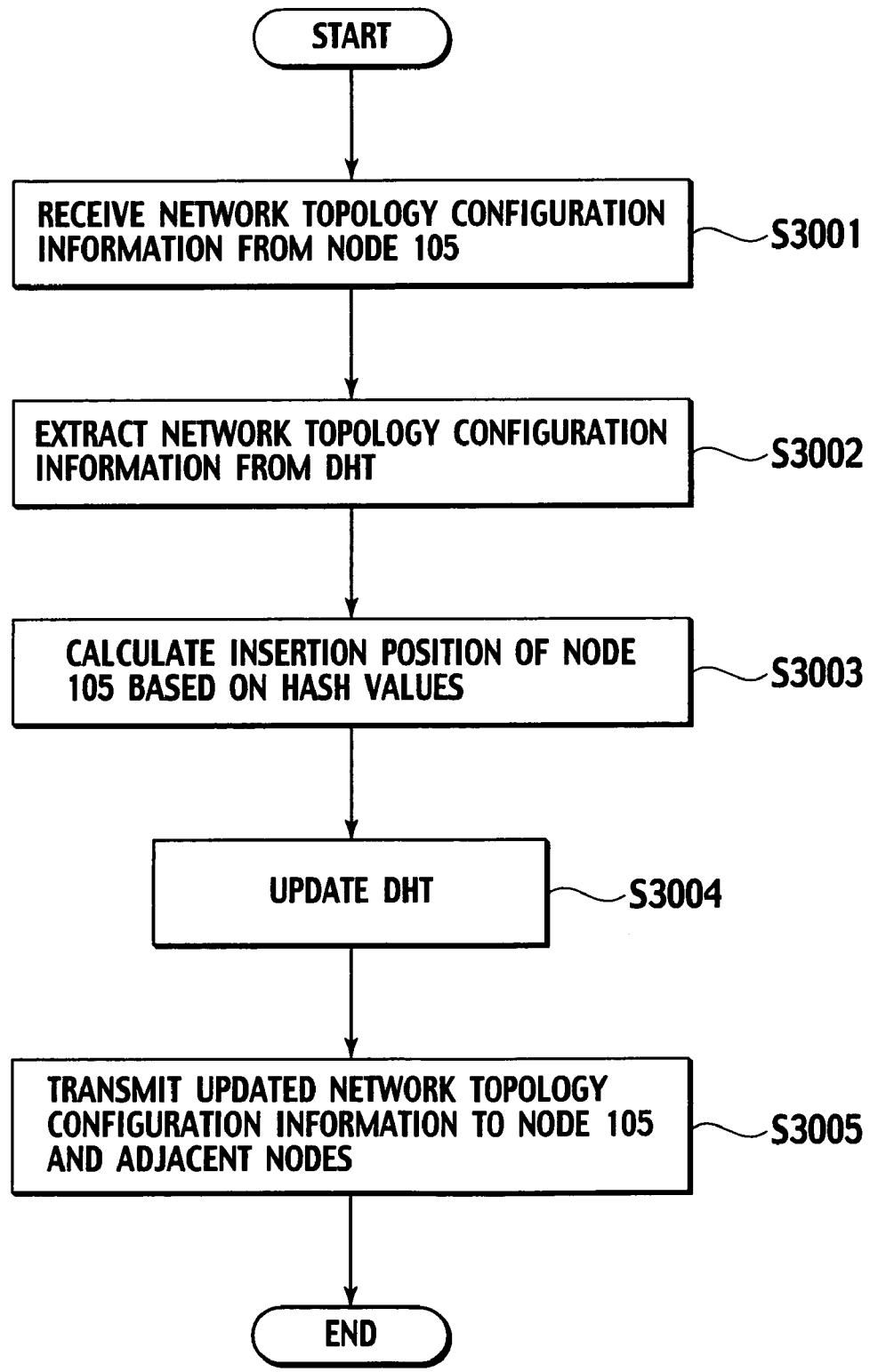
FIG. 16 is a flowchart illustrating an operation of the node in the ring network when the new entry node newly joins the ring network in the second embodiment of the present invention.
Figure 17:
FIG. 17 is a diagram for explaining update of the distributed hash table of the node in the ring network when the new entry node newly joins the ring network in the second embodiment of the present invention.

With reference to FIGS. 16 and 17, the operation of the node 101 in this embodiment will be described.

As shown in FIG. 16, in step 3001, the new entry node accepting unit 100d of the node 101 receives network topology configuration information including the hash value and the node address of the new entry node 105, from the new entry node 105, through a network topology configuration information transmitting-receiving unit 100c.

In step 3002, the new entry node accepting unit 100d extracts the hash values of all the nodes from the distributed hash table 100a.

In step 3003, the new entry node accepting unit 100d calculates the insertion position of the new entry node 105 in the ring network, based on the received hash value of the new entry node 105 and the extracted hash values of all the nodes.

In step 3004, the new entry node accepting unit 100d updates the distributed hash table 100a as shown in FIG. 17, based on the determined insertion position of the new entry node 105.

In step 3005, the new entry node accepting unit 100d transmits the network topology configuration information including the contents of the updated distributed hash table 100a, through the network topology configuration information transmitting-receiving unit 100c, to the new entry node 105 and adjacent nodes 102 and 103.

MODIFICATION

The present invention is not limited to the above-described embodiments. In place of a node 101, a new entry node 105 may be configured to calculate the insertion position of the new entry node 105 in a ring network.

In this case, in place of network topology configuration information including the insertion position of the new entry node 105 in the ring network, the node 101 transmits network topology configuration information including the current contents of a distributed hash table 100a to the new entry node 105. Based on the received network topology configuration information, the new entry node 105 is configured to calculate the insertion position of the new entry node 105 in the ring network.

The present invention provides a network topology configuring method in which a new entry node joins a network by a predetermined algorithm, whereby the new entry node can quickly find the positional relationships between nodes in the network, and an occurrence of a node failure, disengagement or the like in the network only locally affects the network, and a node used in the network topology configuring method.

Additional advantages and modifications will readily occur to those skilled in the art. Therefore, the invention in its broader aspects is not limited to the specific details and the representative embodiment shown and described herein. Accordingly, various modifications may be made without departing from the spirit or scope of the general inventive concept as defined by the appended claims and their equivalents.

What is claimed is:

1. A node constituting a part of an autonomous distributed ring network, comprising:
    a manager configured to manage a distributed hash table which includes a hash value of the node generated from identification information on the node and a hash value of an adjacent node generated from identification information on the adjacent node; and
    a calculator configured to calculate an insertion position in the ring network of a new entry node newly joining the ring network, based on a hash value of the new entry node generated from identification information on the new entry node, the hash value of the node and the hash value of the adjacent node and when calculator determines that the insertion position of the new entry node of the ring network will be between the node and the adjacent node, the calculator replaces the hash value of the adjacent node with the hash value of the new entry node in the distributed hash table, establishes a new connection with the new entry node, and notifies the adjacent node the new insertion position of the new entry node.

2. The node as set forth in claim 1, further comprising:
    an obtainer configured to obtain the hash value of the new entry node from the new entry node; and
    a informer configured to inform the insertion position of the new entry node in the ring network to the new entry node.

3. The node as set forth in claim 2, wherein the informer is configured to limit nodes to which the insertion position of the new entry node is informed, to the new entry node and the adjacent node.

4. The node as set forth in claim 1, wherein the calculator is configured to compare the hash value of the new entry node with the hash value of the node and the hash value of the adjacent node, and to calculate the insertion position of the new entry node so that each node is arranged in the order of the hash values in the ring network.

5. The node as set forth in claim 1, wherein:
    the manager is configured to manage hash values of all nodes constituting the ring network, the hash values being generated from identification information on the all nodes; and
    the calculator is configured to calculate the insertion position of the new entry node in the ring network, based on the hash value of the new entry node and the hash values of all the nodes.

6. The node as recited in claim 1, wherein when the node determines that the insertion position of the new entry node is not between the node and the adjacent node, the calculator determines that the insertion position of the new entry node is unknown, and transmits a network topology configuration information including the hash value of the insertion position of the new entry node to the adjacent node.

7. A new entry node newly joining an autonomous distributed ring network constituted by a plurality of nodes, comprising:
- a manager configured to manage a distributed hash table which includes a hash value of the new entry node generated from identification information on the new entry node;
- a receiver configured to receive a network topology configuration information from one node of the plurality of nodes, the network topology configuration information including a hash value of the one node, which is generated from identification information on the one node, and a hash value of an adjacent node of the one node, which is generated from identification information on the adjacent node;
- a determiner configured to determine whether or not an insertion position of the new entry node is between the one node and the adjacent node;
- a connection establisher configured to establish connections with the one node and with the adjacent node, respectively, when the determiner determines that the insertion position of the new entry node is between the one node and the adjacent node; and
- an updater configured to update the distributed hash table to include a hash value of the one node and the hash value of the adjacent node in addition to the hash value of the new entry node.

8. A method of configuring a network topology in an autonomous distributed ring network constituted by a plurality of nodes, comprising:
- calculating an insertion position in a node of the ring network for a new entry node newly joining the ring network, based on a hash value of the new entry node generated from identification information on the new entry node, and hash values of at least one nodes constituting the ring network, generated from identification information on the at least one nodes;
- replacing the hash value of an adjacent node with the hash value of the new entry node in a distributed hash table when said calculating determines that the insertion position of the new entry node of the ring network will be between the node and the adjacent node;
- establishing a new connection with new entry node; and
- notifying the adjacent node the new insertion position of the entry node.

9. The method of configuring a network topology as set forth in claim 8, further comprising:
- storing the hash value generated from identification information of the new entry node, and configured to store hash values of the at least one nodes constituting the ring network.

10. The method of configuring a network topology as set forth in claim 8, further comprising:
- comparing the hash value of the new entry node with the hash value of the at least one nodes and the hash value of an adjacent node to the at least one nodes; and
- calculating the insertion position of the new entry node so that each node is arranged in the order of the hash values in the ring network.

* * * * *